(12) United States Patent
Dodman

(10) Patent No.: US 12,384,490 B2
(45) Date of Patent: Aug. 12, 2025

(54) BATTERY WHEEL ASSEMBLY

(71) Applicant: Cycling Sports Group, Inc., Wilton, CT (US)

(72) Inventor: Christopher Philip Dodman, Bottmingen (CH)

(73) Assignee: Cycling Sports Group, Inc., Wilton, CT (US)

( * ) Notice: Subject to any disclaimer, the term of this patent is extended or adjusted under 35 U.S.C. 154(b) by 548 days.

(21) Appl. No.: 17/821,848

(22) Filed: Aug. 24, 2022

(65) Prior Publication Data

US 2023/0068251 A1 Mar. 2, 2023

Related U.S. Application Data

(60) Provisional application No. 63/260,547, filed on Aug. 25, 2021.

(51) Int. Cl.
*B62M 6/90* (2010.01)
*B62J 43/13* (2020.01)
(Continued)

(52) U.S. Cl.
CPC ............... *B62M 6/90* (2013.01); *B62J 43/13* (2020.02); *B62J 43/20* (2020.02); *B62M 6/45* (2013.01); *B62M 6/65* (2013.01); *H01M 10/425* (2013.01); *H01M 50/213* (2021.01); *H01M 50/249* (2021.01); *H01M 50/264* (2021.01); *H01M 50/271* (2021.01); *H01M 2010/4271* (2013.01); *H01M 2220/20* (2013.01)

(58) Field of Classification Search
CPC ... B62M 6/90; B62M 6/45; B62M 6/65; B62J 43/20; B62J 43/13; H01M 50/249; H01M 50/264; H01M 50/213; H01M 10/425; H01M 2010/4271; H01M 2220/20; H02M 5/271
USPC ...................................... 180/65.51
See application file for complete search history.

(56) References Cited

U.S. PATENT DOCUMENTS

| 4,645,963 A | 2/1987 | Plackner et al. |
| 6,100,615 A | 8/2000 | Birkestrand |

(Continued)

FOREIGN PATENT DOCUMENTS

| CN | 201018344 | 2/2008 |
| CN | 102001410 A | 4/2011 |

(Continued)

OTHER PUBLICATIONS

International Search Report for PCT/US22/75375 mailed Nov. 30, 2022.

(Continued)

*Primary Examiner* — James A Shriver, II
*Assistant Examiner* — Hilary L Johns
(74) *Attorney, Agent, or Firm* — James Joyce; Godfrey & Kahn, S.C.

(57) ABSTRACT

A battery wheel assembly is disclosed that includes a wheel having an axle for securement to a vehicle, the axle having a central axle axis extending therethrough, a wheel rim and interconnected wheel hub rotatable about the central axle axis. The battery wheel assembly further includes a battery pack that includes a carrier wreath secured to the wheel rim, and a plurality of battery cells electrically interconnected and secured to the carrier wreath.

24 Claims, 18 Drawing Sheets

(51) Int. Cl.
*B62J 43/20* (2020.01)
*B62M 6/45* (2010.01)
*B62M 6/65* (2010.01)
*H01M 10/42* (2006.01)
*H01M 50/213* (2021.01)
*H01M 50/249* (2021.01)
*H01M 50/264* (2021.01)
*H01M 50/271* (2021.01)

(56) References Cited

U.S. PATENT DOCUMENTS

| | | |
|---|---|---|
| 6,565,243 B1 | 5/2003 | Cheung |
| 6,854,543 B2 | 2/2005 | Rowley et al. |
| 7,527,113 B2 | 5/2009 | Jenkins |
| 7,615,903 B2 | 11/2009 | Holmes et al. |
| 8,011,733 B2 | 9/2011 | Su |
| 8,245,804 B2 | 8/2012 | Van Rooij |
| 8,253,294 B1 | 8/2012 | Wishart |
| 8,419,580 B2 | 4/2013 | Lo |
| 8,474,564 B2 | 7/2013 | Radtke |
| 8,531,072 B2 | 9/2013 | Wishart |
| 8,616,314 B2 | 12/2013 | Murata |
| 8,758,178 B2 | 6/2014 | Gunji et al. |
| 8,857,545 B2 | 10/2014 | Lee et al. |
| 9,027,681 B2 | 5/2015 | Biderman et al. |
| 9,306,430 B2 | 4/2016 | Cho et al. |
| 9,308,965 B2 | 4/2016 | Fölmli et al. |
| 9,331,546 B2 | 5/2016 | Kim |
| 9,334,847 B2 | 5/2016 | Harris |
| 9,387,758 B2 | 7/2016 | Heinen et al. |
| 9,438,085 B2 | 9/2016 | Fuchs |
| 9,595,850 B2 | 3/2017 | Duhamel et al. |
| D810,650 S | 2/2018 | Pedrazzo et al. |
| 9,944,349 B2 | 4/2018 | Biderman et al. |
| 10,005,317 B2 | 6/2018 | Biderman et al. |
| 10,065,451 B2 | 9/2018 | Park et al. |
| 10,381,901 B2 | 8/2019 | Zhou et al. |
| 10,507,887 B2 | 12/2019 | Kerschgens et al. |
| 10,811,647 B2 | 10/2020 | Gu et al. |
| 10,896,474 B2 | 1/2021 | Biderman et al. |
| 10,967,934 B2 | 4/2021 | Ferguson |
| 11,110,793 B2 | 9/2021 | Takahashi et al. |
| 2005/0067207 A1* | 3/2005 | Radtke ............... B60L 15/2063 180/223 |
| 2006/0273686 A1 | 12/2006 | Edelson et al. |
| 2007/0187952 A1 | 8/2007 | Perlo et al. |
| 2010/0173188 A1 | 7/2010 | Dhawan et al. |
| 2010/0212980 A1* | 8/2010 | Wang ............... B62M 6/65 318/139 |
| 2011/0042156 A1* | 2/2011 | Vincenz ............... B62K 19/40 224/412 |
| 2011/0139530 A1 | 6/2011 | Ananthakrishna |
| 2011/0233222 A1 | 9/2011 | Bethlenfalvy |
| 2011/0272203 A1* | 11/2011 | Sugimoto ............... B62M 6/90 180/206.1 |
| 2012/0083376 A1 | 4/2012 | Lo |
| 2012/0089299 A1 | 4/2012 | Breed |
| 2012/0169154 A1 | 7/2012 | Curodeau |
| 2012/0306327 A1 | 12/2012 | Lee et al. |
| 2013/0264861 A1 | 10/2013 | Park |
| 2018/0111487 A1 | 4/2018 | Xu et al. |
| 2018/0244341 A1 | 8/2018 | Urban |
| 2020/0139805 A1 | 5/2020 | Biderman et al. |
| 2020/0277021 A1 | 9/2020 | Biderman et al. |
| 2021/0135539 A1 | 5/2021 | Remboski et al. |
| 2021/0188068 A1 | 6/2021 | Yoshizumi et al. |
| 2022/0009578 A1 | 1/2022 | Anderson et al. |
| 2022/0135179 A1 | 5/2022 | Lee |
| 2022/0204132 A1 | 6/2022 | Huang |

FOREIGN PATENT DOCUMENTS

| | | | |
|---|---|---|---|
| CN | 102781768 | A | 11/2012 |
| CN | 202686672 | U | 1/2013 |
| CN | 103442918 | A | 12/2013 |
| CN | 204190553 | U | 3/2015 |
| CN | 205396411 | U | 7/2016 |
| CN | 206977246 | U | 2/2018 |
| CN | 109572388 | A | 4/2019 |
| CN | 109802522 | A | 5/2019 |
| CN | 110729851 | A | 1/2020 |
| CN | 210234645 | U | 4/2020 |
| CN | 111845319 | A | 10/2020 |
| CN | 213566282 | U | 6/2021 |
| CN | 213594435 | U | 7/2021 |
| EP | 0696537 | A3 | 4/1996 |
| EP | 0906842 | A3 | 7/2000 |
| EP | 2423094 | A2 | 2/2012 |
| EP | 2875911 | A1 | 5/2015 |
| EP | 3131185 | | 2/2017 |
| EP | 3216686 | A1 | 9/2017 |
| GB | 2387825 | A1 | 10/2003 |
| GB | 2599592 | A8 | 4/2022 |
| IN | 20130068914 | | 3/2015 |
| JP | 2005-335535 | A2 | 12/2005 |
| JP | 2008-132941 | A2 | 6/2008 |
| KR | 10-2014-0058836 | A | 5/2014 |
| TW | 398728 | U | 2/2011 |
| WO | WO-2010077300 | A2 * | 7/2010 ............ B62M 6/45 |
| WO | WO2010077300 | | 8/2010 |
| WO | WO2011096658 | | 8/2011 |
| WO | WO2011120124 | A1 | 10/2011 |
| WO | WO2011096658 | A3 | 11/2011 |
| WO | WO2015121754 | A2 | 8/2015 |
| WO | WO2016137418 | | 9/2016 |
| WO | WO2018010669 | A1 | 1/2018 |
| WO | WO2019114592 | A1 | 6/2019 |
| WO | WO2020125586 | A1 | 6/2020 |

OTHER PUBLICATIONS

A New Magnetic-Planetary-Geared Permanent Magnet Brushless Machine for Hybrid Electric Vehicle Journals & Magazines >IEEE Transactions on Magnetics > vol. 48 Issue: 11; Xiaoyong Zhu, Long Chen, Li Quan, Yanbiao Sun, Wei Hua, Zheng Wang; website captured May 14, 2022.
All in One Imortor 3.0 Smart Electric Front Wheel Ebike Conversion Kit for Bike With Battery; Feb. 26, 2021.
Alternator Slip ring for Delco Cs121,Ir/ef; Jun. 16, 2021.
Bionx SL250 RR XL; Apr. 28, 2021.
Dynamic Response Analysis for NW Planetary Gear Transmission Used in Electric Wheel Hub, accepted Jul. 21, 2019, date of publication Jul. 26, 2019, date of current version Aug. 23, 2019. Digital Object Identifier 10.1109/ACCESS.2019.2931292; Zhuxiang Ou, Chaosheng Song, Caichao Zhu, and Xingyu Yang.
Endless Sphere DIY Electric Vehicles and more . . . (blog); website captured May 14, 2022.
ESK8 Innovations—Geared Hub Motor for Electric Skateboard— Stary on Kickstarter; website captured May 14, 2022.
GeoOrbital Wheel; website geoo.com; Jun. 6, 2015.
Heinzmann Cargopower System; 2021.
Natural Frequencies and Vibrating Modes for a Magnetic Planetary Gear Drive Jan. 2012 Shock and Vibration 19 (6):1385-1401 DOI:10.1155/2012/614134; Lizhong Xy and Xuejun Zhu.
Smart in-wheel generator using adaptive DC-DC converter for rechargeable batteries in electric vehicles; International journal of precision engineering and manufacturing 15.6 (2014): 1009-1013; Ngoc T. Nguyen, Hung V. Ho, Sung-Tae Hong, and Franklin Bien; Jun. 2014.

* cited by examiner

BATTERY WHEEL ASSEMBLY

CROSS REFERENCE TO RELATED APPLICATION

This application claims the benefit of and priority to U.S. Provisional Patent Application Ser. No. 63/260,547 filed Aug. 25, 2021, which is incorporated herein by reference in its entirety for all purposes.

FIELD OF THE INVENTION

The invention relates generally to wheel components. More particularly, the invention relates to wheel assemblies used in vehicles.

BACKGROUND

Electric bicycles use electric motors to provide powered propulsion assist to a user. The motor is typically mounted in the crank region at the base of the main frame, but can also be mounted in a hub of the front wheel or rear wheel. Power for the motor comes from one or more battery cells. With a crank region motor, the battery cells are typically mounted on or partially/completely in the frame of the bicycle to provide a convenient connection to the motor, whereas a hub mounted motor may be wired to a frame mounted battery or a battery mounted inside the hub itself adjacent to the motor. Unfortunately, mounting the battery in the hub can be problematic, for example, the battery is housed with and mounted directly adjacent to a motor, which generates significant heat during operation. The battery absorbs the motor heat, which reduces efficiency of the battery, and along with the battery's own generated heat that is trapped in the hub, causes diminishing battery performance. In addition, the hub itself must be large enough to accommodate both the battery and the motor.

Typically, electric bicycle hub motors use a fixed stator where the stator is fixed to a non-rotating axle attached to the bicycle frame. Rotation of the wheel is then sensed between the rotating hub shell and the axle—by means of a magnet in the hub shell and a Hall-effect sensor or reed switch mounted to the stator/axle. In addition, electric bikes, such as mid-drive electric bicycles typically include a rotation sensor about the wheel to send feedback via wiring to a frame-mounted controller to measure rotation between the axle and the hub shell. In most mid-drive electric bicycles, the Hall-effect sensor is mounted on the chain stay of the frame and a magnet is mounted to a spoke. Many modern systems use a Hall-effect sensor mounted onto the inside of a disc side dropout and the disc brake rotor has a magnet attached to it.

BRIEF SUMMARY

In at least some embodiments, a battery wheel assembly is provided that includes: a wheel comprising: an axle for securement to a vehicle, the axle having a central axle axis extending therethrough; a wheel rim; and a wheel hub interconnected with the wheel rim and rotatable about the central axle axis; and a battery pack comprising: a carrier wreath secured to the wheel rim; and a plurality of battery cells electrically interconnected and secured to the carrier wreath.

Further embodiments of the invention are disclosed herein. The invention is generally described for use with a bicycle, although in additional embodiments, the technology of the invention can be utilized in numerous wheel applications, including those noted herein.

BRIEF DESCRIPTION OF THE DRAWINGS

Embodiments of the invention are disclosed with reference to the accompanying drawings and are for illustrative purposes only. The invention is not limited in application to the details of construction or the arrangement of the components illustrated in the drawings. The invention is capable of other embodiments or of being practiced or carried out in other various ways.

DETAILED DESCRIPTION

Figure 1:
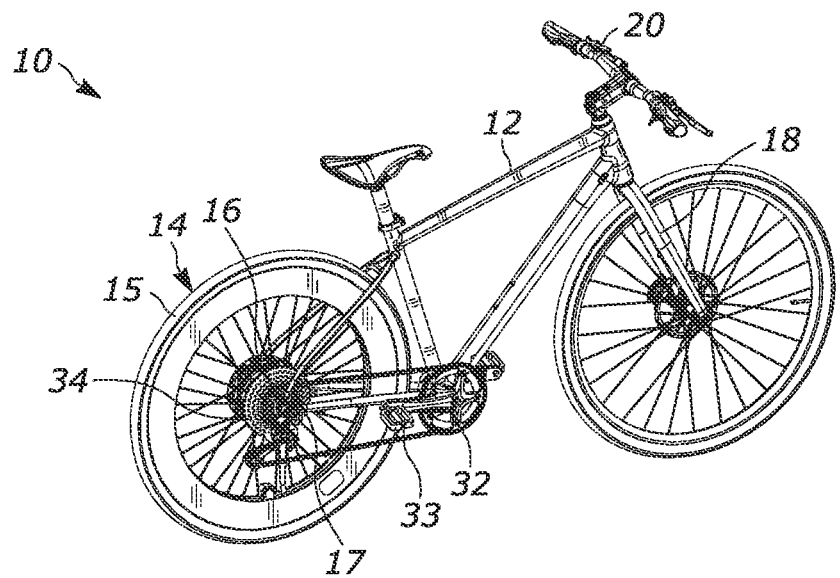
FIG. 1 is a side perspective view of an exemplary bicycle.
Figure 2:
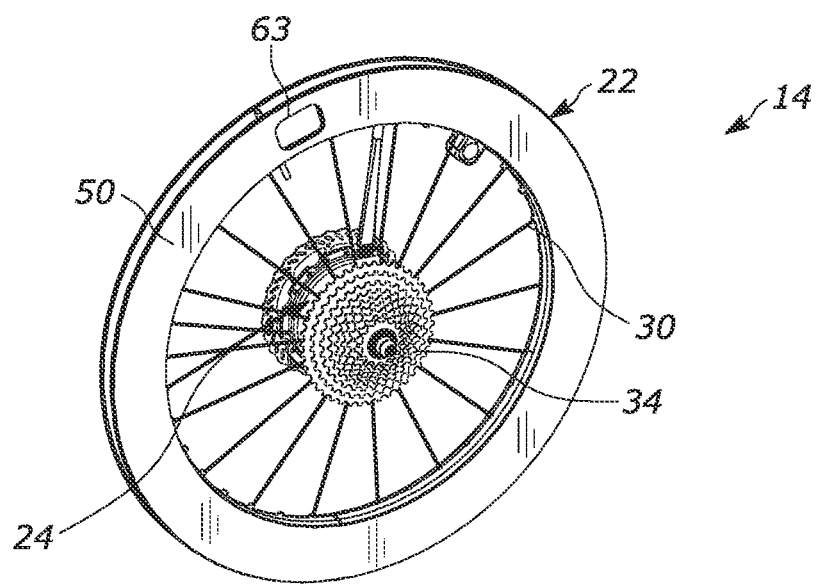
FIG. 2 is a first side perspective view of the wheel of the bicycle of FIG. 1 with the tire removed for clarity.
Figure 3:
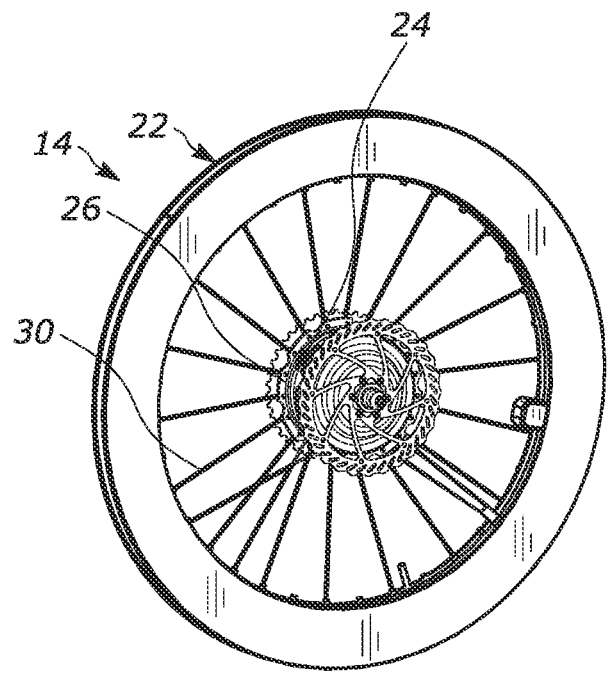
FIG. 3 is a second side perspective view of the wheel of FIG. 2.
Figure 4:
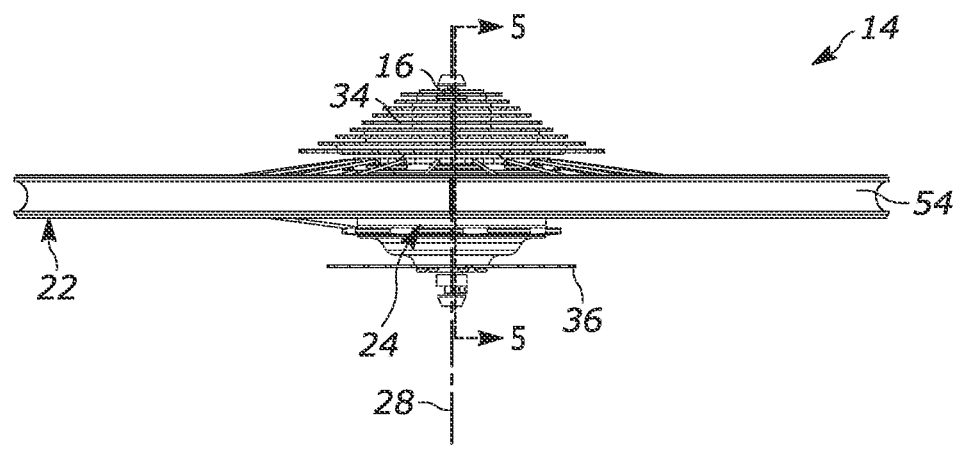
FIG. 4 is a top view of the wheel of FIG. 2.

Referring to FIG. 1, a perspective view of an exemplary bicycle 10 is provided that includes a frame 12 coupled to a wheel 14 having a tire 15 (only shown in FIG. 1, for clarity purposes) and an axle 16 that is securable to the frame 12.

In at least some embodiments, the frame 12 is a one-piece frame (e.g., a hard-tail), while in other embodiments the frame 12 can include a main frame coupled with a rear frame portion that is translatable relative to the main frame (e.g., a soft-tail/full suspension). In at least some embodiments, the wheel 14 is a rear wheel that is secured by the axle 16 to, for example, one or more dropouts 17 extending from the main frame or rear frame portion, while in other embodiments, the wheel 14 can be a front wheel secured by the axle 16 to a front fork 18 interconnected with a pair of handlebars 20.

Referring to FIGS. 2-5, the wheel 14 includes a wheel rim 22 interconnected with a wheel hub 24. The wheel hub 24 includes a hub shell 26 and is connected with the axle 16 to rotate about a central axle axis 28 of the axle 16. The wheel rim 22 is interconnected to the wheel hub 24 by a plurality of spokes 30, which can be provided in numerous shapes, sizes, and materials. The spokes 30 can take many forms including individual metal spokes, as well as spokes 30 that are integrated with the wheel rim 22 and the hub shell 26, rather than a separately coupled structure. In at least some embodiments, the spokes 30 can be a singular disc-shaped extension that extends radially from the hub shell 26 (e.g., form a continuous wall therebetween).

The bicycle 10 further includes a pedal crank 32 that is coupled with the wheel hub 24 (e.g., via chain and sprockets, etc.), thereby allowing an operator of the bicycle 10 to rotate the wheel hub 24 via a pedaling action on pedals 33 coupled to the pedal crank 32. In at least some embodiments, the wheel hub 24 can be coupled with a gear cassette 34 as further described below, as well as a brake disc 36 for engagement with a brake caliper (not shown) to provide a stopping force to the wheel 14. In at least some embodiments, other types of braking can be provided such as, a rim brake, a drum brake, or solely regenerative braking from the motor as is typical with electric (stand up/kick) scooters.

Figure 5:
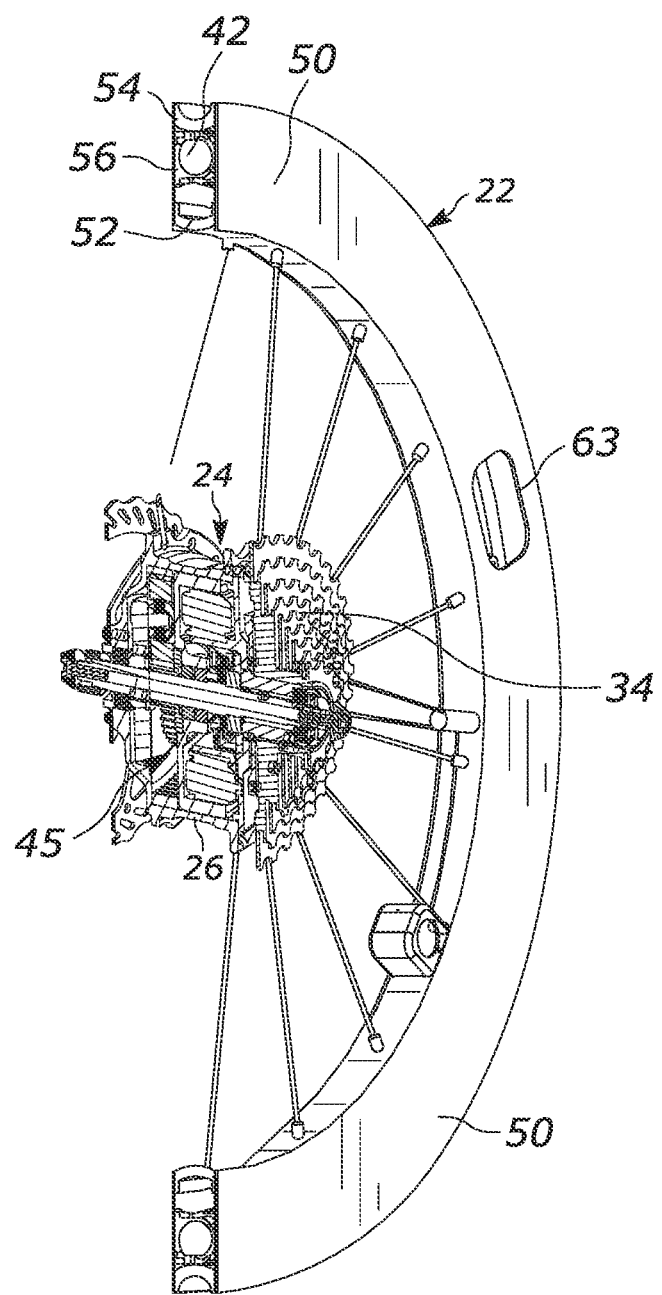
FIG. 5 is a cross-sectional view of the wheel taken along line 5-5 of FIG. 4.
Figure 6:
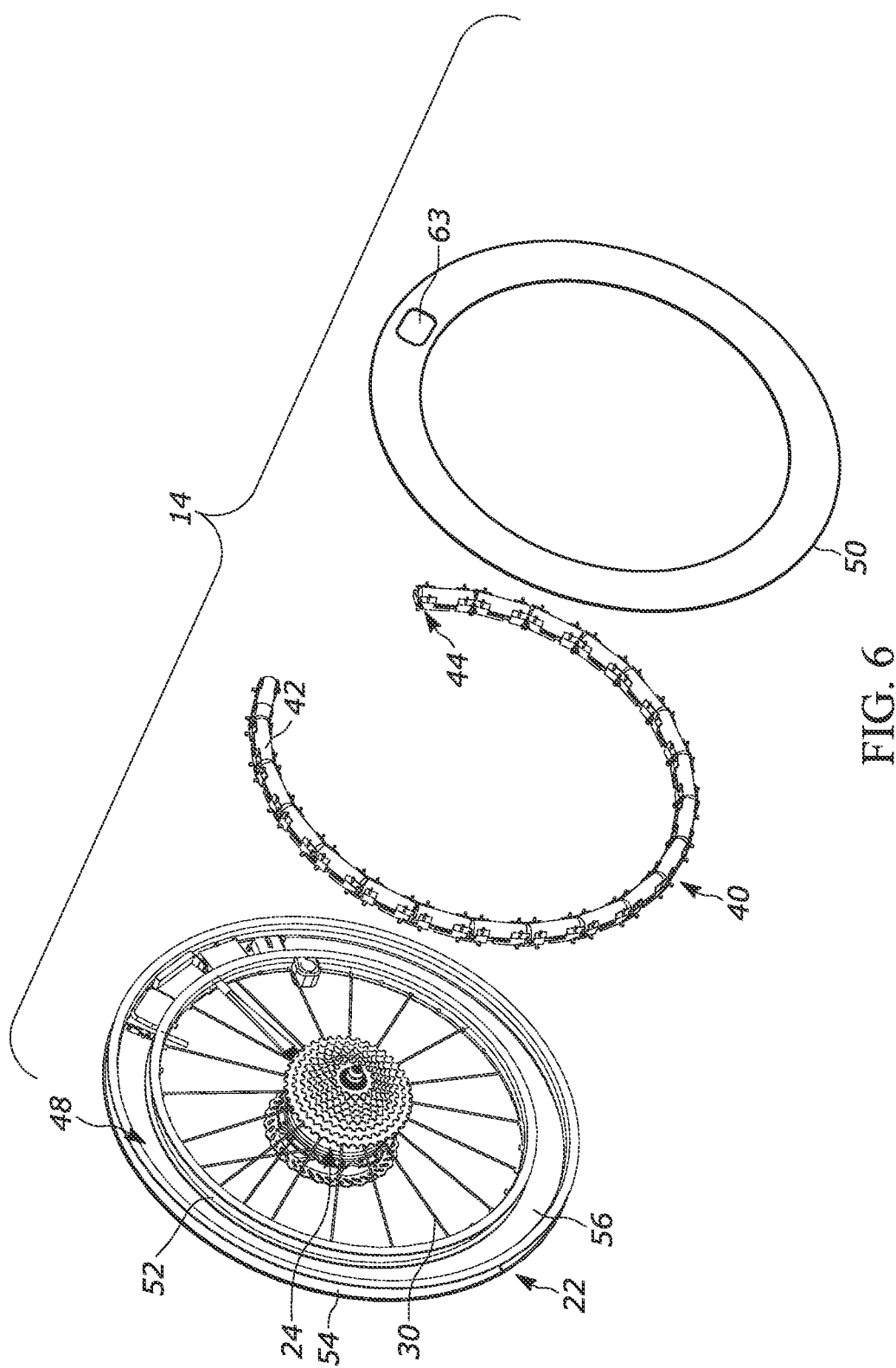
FIG. 6 is a partial exploded view of the wheel of FIG. 2.

Referring to FIGS. 5 and 6, wheel 14 is shown in cross-sectional and partially exploded views. The wheel 14 further includes an exemplary battery pack 40 that includes a plurality of battery cells 42 electrically coupled together and secured to a carrier wreath 44, wherein the battery pack 40 is at least indirectly electrically coupled to a hub motor 45 used to provide a rotational force to the wheel 14. In at least some embodiments, the battery pack 40 is sized and shaped to fit in a battery compartment 48 formed in the wheel rim 22, wherein the battery compartment 48 is closable by a removable cover plate 50 sized to generally cover the opening exposing the battery compartment in the wheel rim 22. Although in some embodiments the battery compartment 48 is a continuous compartment, in at least some embodiments, the battery compartment 48 can include multiple dividers separating adjacent portions thereof, such that the battery compartment 48 includes a plurality of divided compartments collectively forming the battery compartment. The cover plate 50 can in at least some embodiments, be a generally planar ring-shape, while in other embodiments other shapes and sizes, including various curvatures can be provided to at least in part, close or at least partially close the battery compartment 48. In at least some embodiments, the battery compartment 48 is situated inside the wheel rim 22 and outside of the hub shell 26 (e.g., for a typical spoked rim), while in other embodiments the wheel rim 22 can be formed with the hub shell 26 as noted above.

The battery compartment 48 can take many forms and is sized and shaped to house the battery pack 40 within the wheel rim 22, wherein in at least some embodiments, it is bounded by an inner ring 52, an outer ring 54, a rim sidewall 56, and the cover plate 50, while in other embodiments, the battery compartment 48 can include more or less walls or wall portions. In at least some embodiments, the outer ring 54 and inner ring 52 are formed separately and then secured (e.g., welding, adhesive bonding, mechanical fasteners, etc.) to the rim sidewall 56, where in at least some embodiments, the rim sidewall 56 is shaped similar to the cover plate 50 (e.g., generally planar ring-shaped), while in other embodiments, the outer ring 54, inner ring 52, and rim sidewall 56 are integrally formed, while in still further embodiments, other configurations of forming and assembly can be used to provide wheel rim 22 having a desired strength and size. In addition, cover plate 50 can be secured at least indirectly to the outer ring 54 and/or inner ring 52 using various fastening methods, and as such can be removable for servicing, part replacement, etc., or permanently attached. Such fastening methods can include, for example, any combination of friction stir welded, ultrasonic welded, diffusion bonded, laser welded, laser brazed, adhesive bonding, film adhesive (high strength thin double-sided tape), heat activated adhesive that can unbonded at a temperature safe for the battery cells—for servicing, bolts, nuts, pins, split pins, roll pins, thread rolled—flow drilled holes, etc. In at least some embodiments, the fastening method can include threaded inserts and bolts or rivets (e.g., "blind" one sided pop rivets), and if the wheel rim 22 and cover plate 50 are composite— they can be "over wrapped" with composite (a layer of composite, such as glass fiber or CFRP woven tape with epoxy resin that is applied onto and over the edge of the cover plate and onto the wheel rim.

The wheel rim construction can be configured to provide the opportunity to replace an internal element or the battery pack either using bolts to attach the cover plate or using pop rivets to attach the cover plate, which can be drilled out and replaced. Also, if the wheel rim was damaged e.g., by an impact/pothole—the electronics and battery pack could be transferred to a new wheel rim. The various components of the wheel rim 22 can be formed using any of various types of materials (e.g., fiber reinforced plastic, carbon fiber, metal, etc.) and using any of various methods, such as injection molding, 3D printing, or casting (e.g., magnesium, aluminum, etc.). In addition, various components of the wheel rim 22 can be formed in whole or in part, integrally with the hub shell 26.

Figure 7:
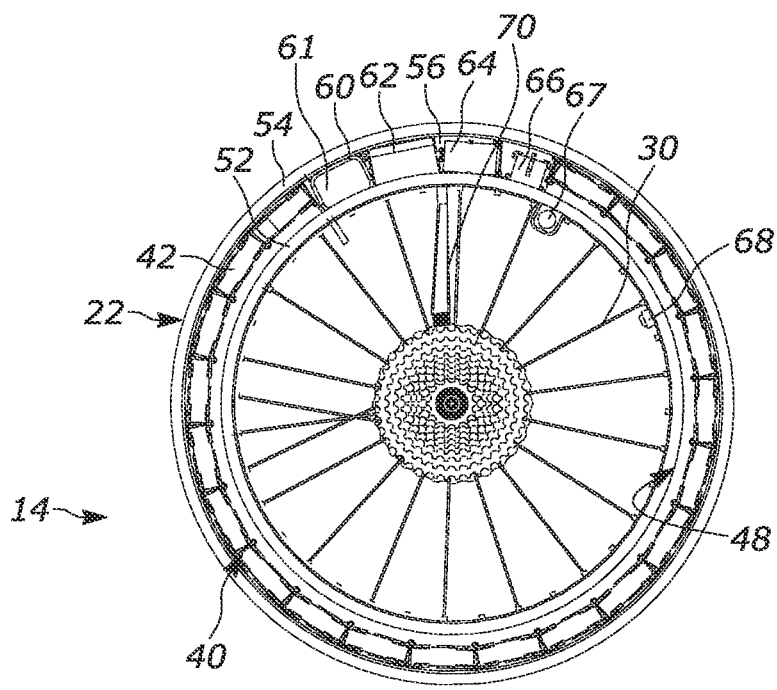
FIG. 7 is a first side view of the wheel of FIG. 2, with the cover plate removed for clarity.

Referring now to FIG. 7, a side view of the wheel 14 is provided, with the cover plate 50 removed for clarity to expose the battery compartment 48. In this view, the battery pack 40 can be seen situated inside the battery compartment 48, above the inner ring 52 and below the outer ring 54, noting that the outer ring 54 is sized and shaped to receive and seat the tire 15 thereover (e.g., circular in circumference and curved along its width), whereas the inner ring 52 is configured for securement to the wheel hub 24 (e.g., spokes 30, etc.) and therefore can be similar to or vary in size and shape to the outer ring 54. As seen in FIG. 7 the wheel 14 can further include other electronic devices housed at least partially in the battery compartment 48 for monitoring and controlling various aspects of the wheel 14, such as the battery pack 40 and the hub motor 45.

In at least some embodiments, the battery compartment 48 can receive one or more of, a local user interface 60, a motor controller 62, one or more Battery Management Systems (BMS) 64, RFID and/or NFC circuits for communicating battery and/or other information to or from a user (e.g., via communication with a remote user interface 59, such as a mobile phone, wireless user interface mounted on the frame 12, etc.), a radio Frequency (RF) cutout 66, and/or a master power ON/OFF switch 67. In at least some embodiments, the motor controller 62 is secured to the wheel rim 22 (e.g., to the rim sidewall 56) in a manner that allows the wheel rim 22 to serve as a heat sink, for example, metal-to-metal engagement therebetween, etc.). The BMS can also be mounted in a similar manner to utilize the wheel rim 22 as heat sink. Providing such a large heat sink (wheel rim) with good airflow therearound during operation allows these devices to run cool and efficiently and at high power levels for their size.

The Radio Frequency (RF) cutout 66 can be handlebar mounted remote power ON/OFF relay/switch. The local user interface 60 can provide user access to monitor and adjust various features using multiple buttons and/or an illuminated screen 61 (e.g., LCD) to control ON/OFF and adjust electronic assistance level (e.g., low, medium, high). The screen 61 can also display information such as the power level selected, battery status (e.g., 5 bar LED display, charging status, multi color LED, or battery percentage, remaining range in Miles/km, total distance ridden, trip distance, average speed, max speed, etc.). The screen 61 can be a touchscreen to receive user inputs, or a passive display.

A non-rotating power output can be provided to power other devices 55, such as lights, etc. The power output can include a port provided to a stationary part of the bicycle 10 and receive power from the wheel hub 24, such as via a DC-DC converter 53 (see FIG. 26) providing a 12 VDC output that is wired to the wheel hub 24 using multi-pole rotary electrical connection 57 (e.g., slip ring configuration). An ON/OFF switch can be coupled with the power output that is accessible by the screen 61 or a separate discreet switch. In at least some embodiments, during operation, the screen 61 can be constantly illuminated (and master power ON/OFF switch 67 if desired) to provide increased visibility for other road users as they would spin when the bicycle 10 is being operated and create a ring of light—wherein the cover plate 50 can include a window 63 to provide screen visibility and to allow a user to conveniently access the local user interface 60.

The motor controller 62 is a processor-based device that receives various inputs as discussed below and provides controlled power from the battery pack 40 to the hub motor 45 as required. Various types of motor controllers are well known and therefore not discussed in detail here. The BMS 64 is interconnected with the battery cells 42. BMS devices are well known for sensing the voltage and/or current of the battery cells and provide monitoring for overvoltage, undervoltage, etc., as well as regulation of voltage and/or current provided to battery cells during use and the charging process.

Figure 8:
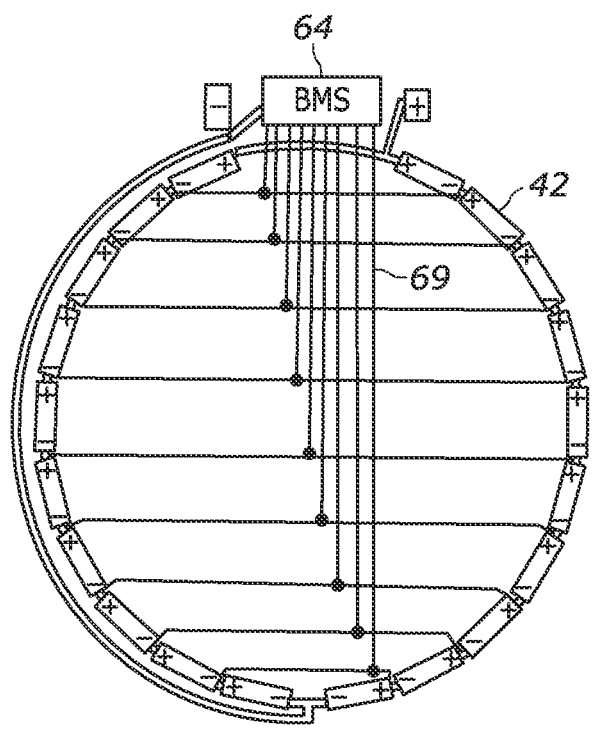
FIG. 8 is a schematic of an exemplary wiring configuration for the battery pack and the BMS for the wheel of FIG. 7.
Figure 9:
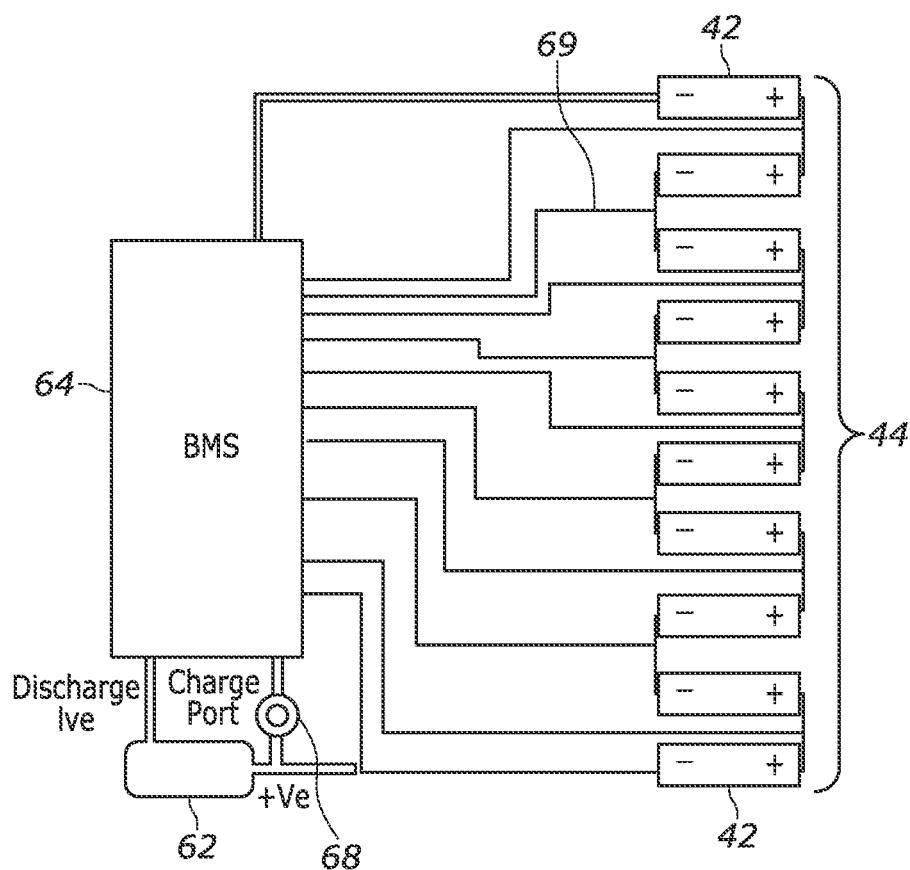
FIG. 9 is a schematic of another exemplary wiring configuration for the battery pack, the BMS, and the motor controller for the wheel of FIG. 7.

Numerous wiring configurations of the battery cells 42 can be utilized. For example, as seen in FIG. 8, to match the ring-shaped wheel rim 22, the battery cells 42 can be positioned and electrically coupled in a circular configuration (e.g., a "sausage string") that can be easily fitted inside the battery compartment 48. This circular configuration can prevent or limit overheating as the battery cells 42 are spaced apart and fixed in place around the wheel rim 22. FIGS. 8 and 9 illustrate exemplary wiring configurations to electrically couple the battery cells 42.

The battery cells 42 are electrically coupled to the motor controller 62 for powering the hub motor 45 situated in the wheel hub 24. In at least some embodiments, the battery cells 42 are wired to provide a power output (+, −), and a charge port 68 is wired to the BMS 64 for recharging. The charge port 68 can take many forms, such as a typical female socket, an inductive wireless charging point, etc. Further, as shown, BMS cell balancing wires 69 can be connected at the positive terminal/connection between series connected pairs of battery cells 42, or other desired connection points, the cell balancing wires 69 providing battery cell 42 monitoring at the various connection points along the battery pack 40.

The battery cell wiring configuration shown in FIG. 9 illustrates the battery cells 42 connected directly in series, with BMS cell balancing wires 69 connected at the series connection of each battery cell 42. The battery cells 42 can include any of various types of battery chemistry, such as Lithium Polymer, Nickel-metal Hydride, solid state, etc. In the case of some battery chemistry, the BMS 64 may not be desirable or necessary. Further, the battery cells 42 can take many forms, and in at least some embodiments, can be any of cylindrical, prismatic/rectangular, pouch cells, round, flat, arced, etc. The battery cells 42 and other electrical components can be electrically wired from the wheel rim 22 to the wheel hub 24 via one or more wires run along the spokes 30 or through a dedicated tube, such as exemplary cable tube 70 (see FIG. 7), or a hollow spoke leg extending between the wheel rim 22 and wheel hub 24. In at least some embodiments, the spokes could be used as individual conductors, eliminating/reducing separate wires running down the spokes—e.g., for high current/power phase wires, wherein the ends of the spokes would be insulated from each other. Minimizing the number of wires running between the wheel rim 22 and the wheel hub 24 can be achieved in many ways apparent to those skilled in the art.

Figure 10:
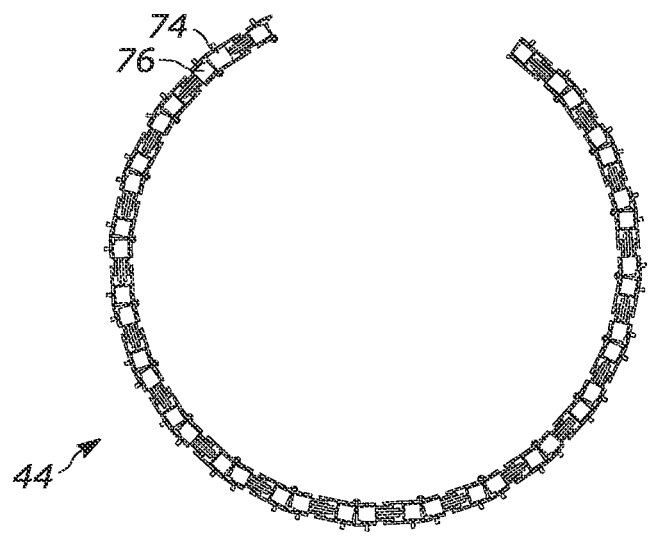
FIG. 10 is a first side view of the carrier wreath of the wheel of FIG. 6, shown without the battery cells installed.
Figure 11:
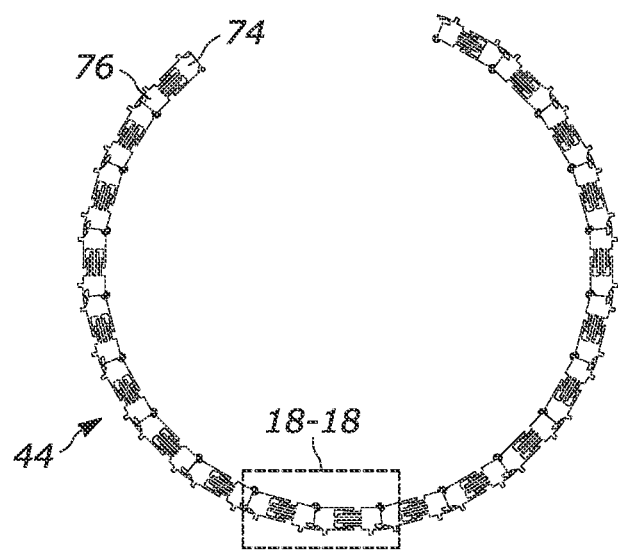
FIG. 11 is a second side view of the carrier wreath of FIG. 10.

Referring now to FIGS. 10 and 11 illustrating exemplary first and second side views of the carrier wreath 44 without the battery cells 42 installed. The carrier wreath 44 is configured to secure the battery cells 42 in a generally arced/curved manner to match the contour of the wheel rim 22. To provide the curved arrangement and the versatility to secure a desired number of battery cells, a plurality of coupled carrier links 73 are utilized. More particularly, the carrier wreath 44 includes a plurality of carrier links 73, wherein the carrier links 73 include a primary carrier 74 removably interconnected with a secondary carrier 76. The carrier links 73 are each configured to secure a battery cell 42 and be coupled together in a generally circular manner.

Figure 12:
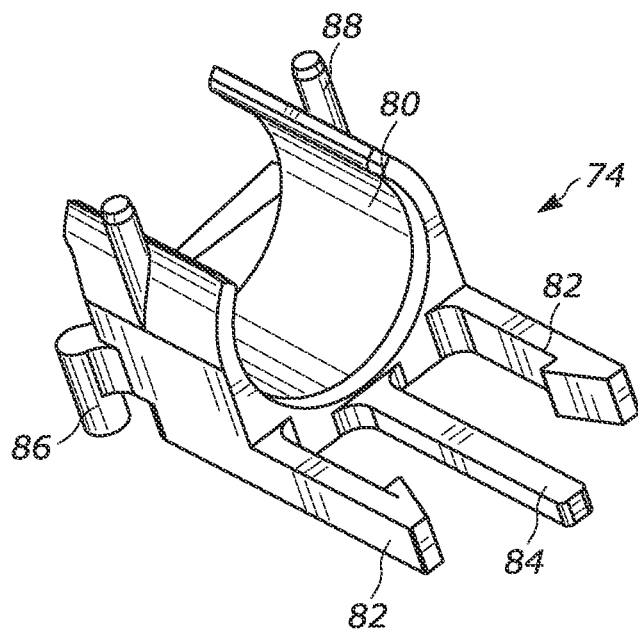
FIG. 12 is a top perspective view of a primary carrier of the carrier wreath of FIG. 10.
Figure 13:
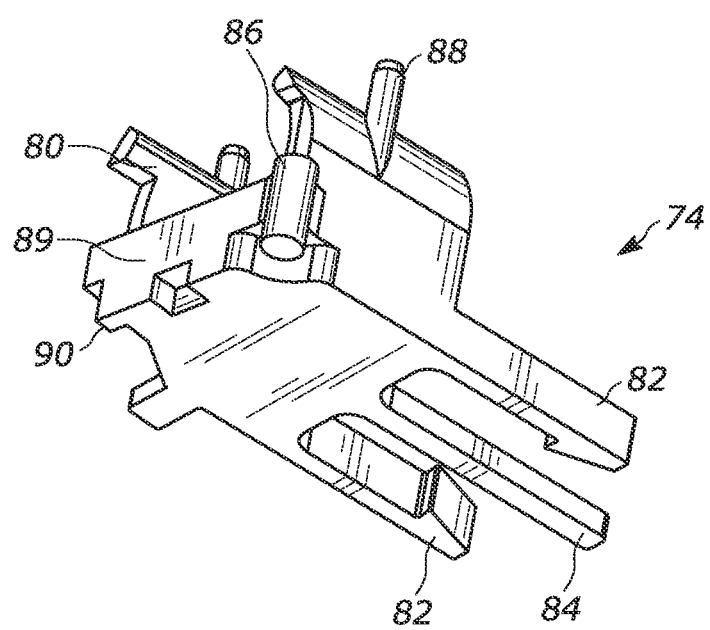
FIG. 13 is a bottom perspective view of the primary carrier of FIG. 12.

Referring to FIGS. 12 and 13, top and bottom perspective views of an exemplary primary carrier 74 are provided. In at least some embodiments, the primary carrier 74 includes a primary cell holder 80 that can be shaped and sized to securably engage a desired battery cell 42 (e.g., a curved C-shape to engage a cylindrical cell, a U-shape for a flatter cell, etc.). The primary carrier 74 can also include a plurality of primary clips 82 and a primary alignment bar 84, all extending longitudinally away from the primary cell holder 80. A pivot peg 86 is provided on an opposite side of the primary cell holder 80 and extends generally perpendicular to the primary clips 82. A plurality of primary pillars 88 can be provided extending upwards from either side of the primary cell holder 80, wherein the primary pillars 88 extend perpendicular to the primary clips 82 and are sized to abut with the cover plate 50, such that when the cover plate 50 is secured in place it aids to secure the primary carrier 74 in place, and they can also help channel electrical wiring within the battery compartment 48. The primary carrier 74 includes a primary end wall 89 that tapers in at least some embodiments. A carrier catch 90 can be provided, that in at least some embodiments is situated opposite the pivot peg 86 adjacent the primary end wall 89, and in at least some embodiments is shaped as a protrusion that can be latched onto.

In at least some embodiments, the battery pack 40 is one piece forming a circle or partial circle, while in other embodiments, the battery pack 40 can include two or more separate curved groups of carrier links 73 and battery cells 42 wired together and configured to fit on opposing sides of the wheel rim 22, wherein separate BMS's 64 can be used for each group.

Figure 14:
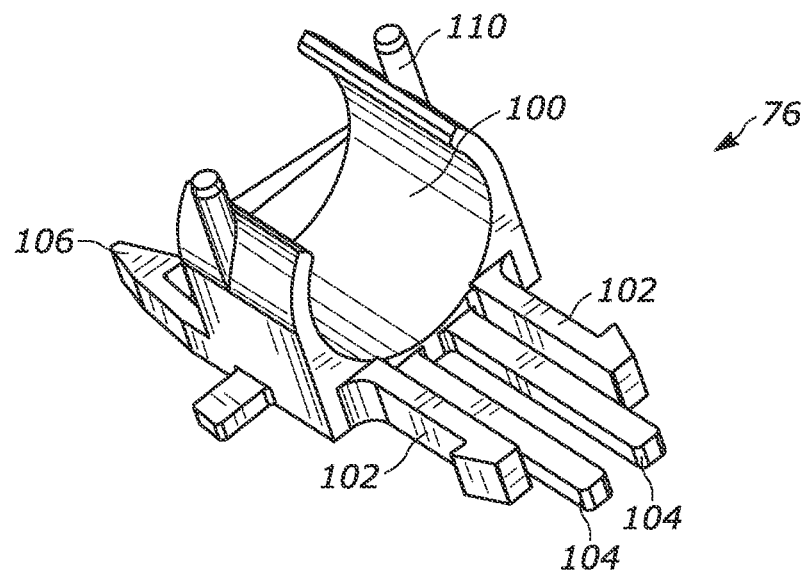
FIG. 14 is a top perspective view of a secondary carrier of the carrier wreath of FIG. 10.
Figure 15:
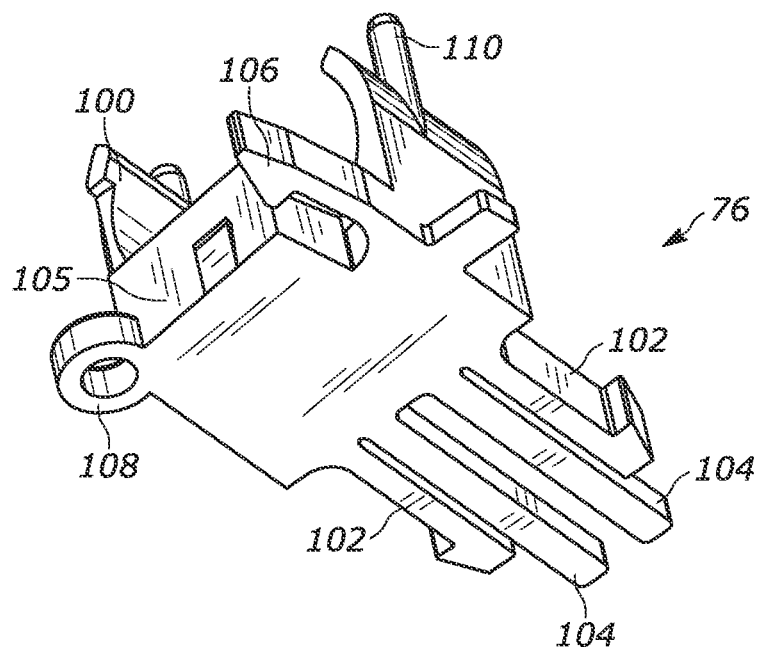
FIG. 15 is a bottom perspective view of the secondary carrier of FIG. 14.

Referring now to FIGS. 14 and 15, top and bottom perspective views of an exemplary secondary carrier 76 are provided. In at least some embodiments, the secondary carrier 76 includes a secondary cell holder 100 that is shaped and sized similar to primary cell holder 80 to engage a battery cell 42. As the secondary carrier 76 is configured to be engaged with the primary carrier 74 to form the carrier link 73, the secondary carrier 76 includes several complementary features to facilitate the engagement. More particularly, in at least some embodiments, the secondary carrier 76 includes a plurality of secondary clips 102 and secondary alignment bars 104, all extending longitudinally away from the secondary cell holder 100. The secondary carrier 76 includes a secondary end wall 105 that in at least some embodiments is tapered. A carrier latch 106 is provided that in at least some embodiments, is situated on an opposite side of the secondary cell holder 100 and extends generally in an opposite longitudinal direction from the secondary clips 102. A pivot ring 108 is provided that in at least some embodiments is situated adjacent the secondary end wall 105 and opposite the carrier latch 106 relative to the secondary end wall 105. A plurality of secondary pillars 110 can be provided extending upwards from either side of the secondary cell holder 100, providing the similar function as the primary pillars 88.

Figure 16:
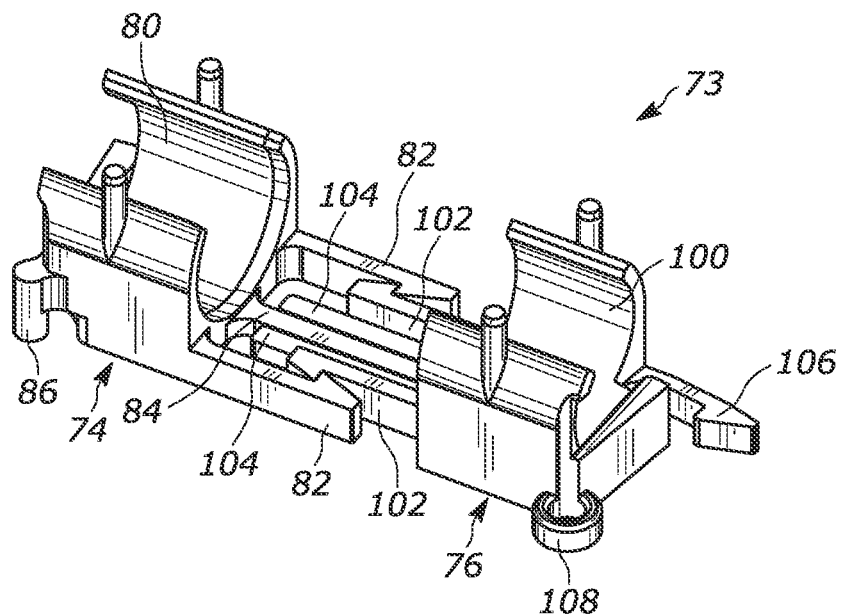
FIG. 16 is perspective view of a carrier link formed by coupling the primary carrier to the secondary carrier.
Figure 17:
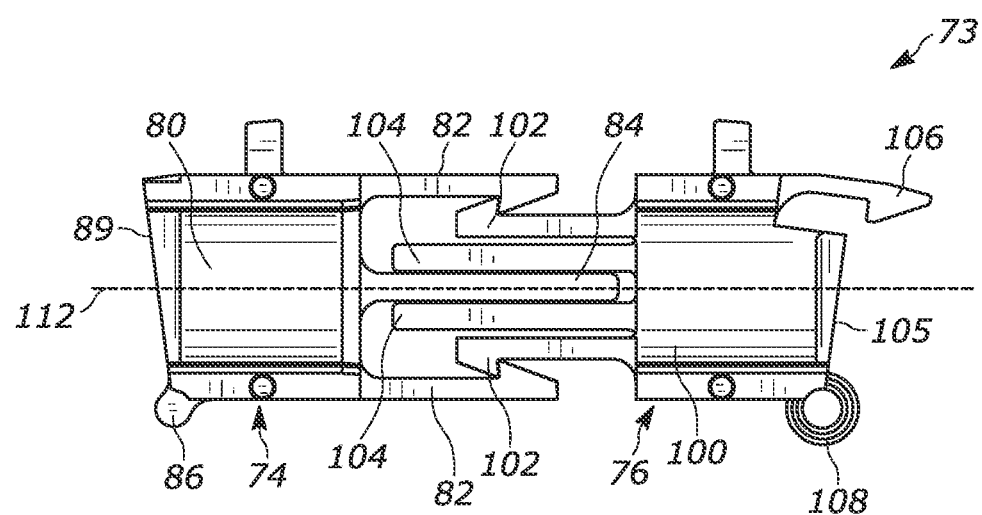
FIG. 17 is top view of the carrier link of FIG. 16.

Referring now to FIGS. 16 and 17, the primary carrier 74 is shown coupled with the secondary carrier 76 to form the carrier link 73. As the carrier link 73 is configured to engage a battery cell 42, in at least some embodiments, the primary alignment bar 84 and secondary alignment bars 104 are straight with the primary alignment bar 84 being complementarily received between the secondary alignment bars 104 to align the primary carrier 74 and the secondary carrier 76. The primary clips 82 are then aligned outside of the secondary clips 102, with the primary clips 82 facing inward and the secondary clips 102 facing outward, such that pushing the primary carrier 74 into the secondary carrier 76 with the primary alignment bar 84 being received in between the secondary alignment bars 104, causes the primary clips 82 to latch with the secondary clips 102, noting that the forced alignment caused by the primary alignment bar 84 in between the secondary alignment bars 104 assists to keep the clips 82, 102 in an engaged position. Once fully engaged, the primary carrier 74 and secondary carrier 76 form the carrier link 73, which can be coupled with another carrier link 73. Once the carrier link 73 is formed, the primary cell holder 80 and secondary cell holder 100 are aligned so as to receive, for example, a cylindrical battery cell. For reference, the carrier link 73 has a central longitudinal axis 112 (FIG. 17) (e.g., extending through the primary alignment bar 84).

Figure 18:
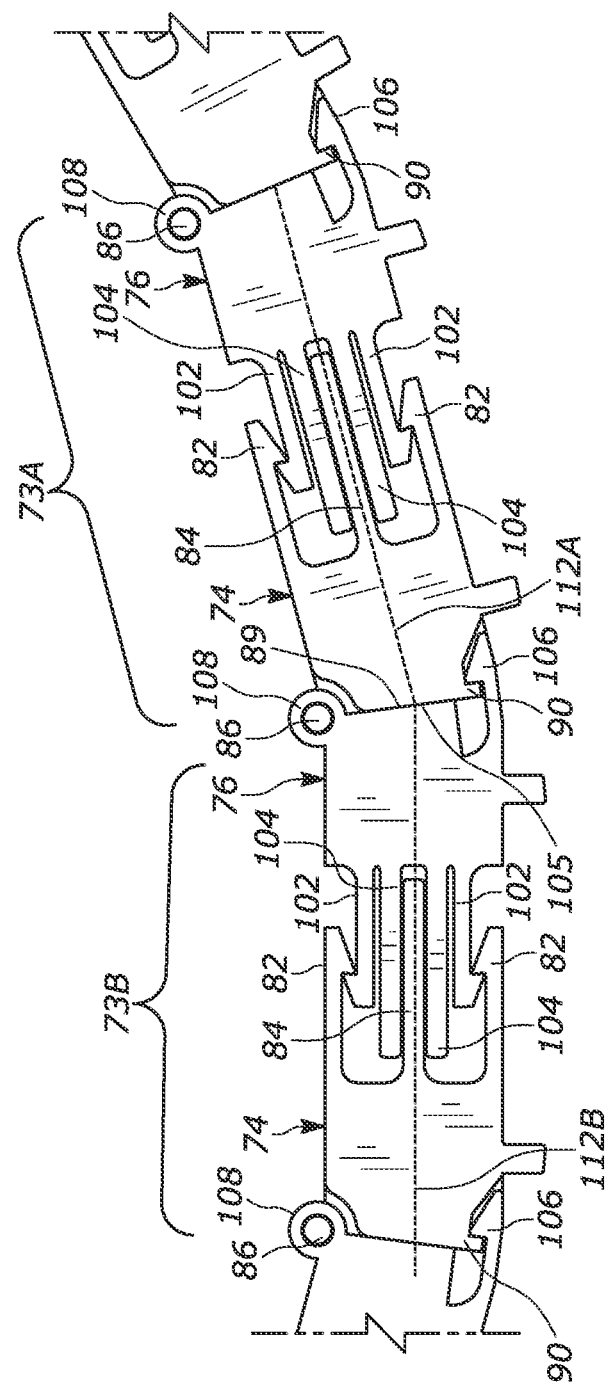
FIG. 18 is a close-up second side view of the carrier wreath taken at 18-18 of FIG. 11.
Figure 19:
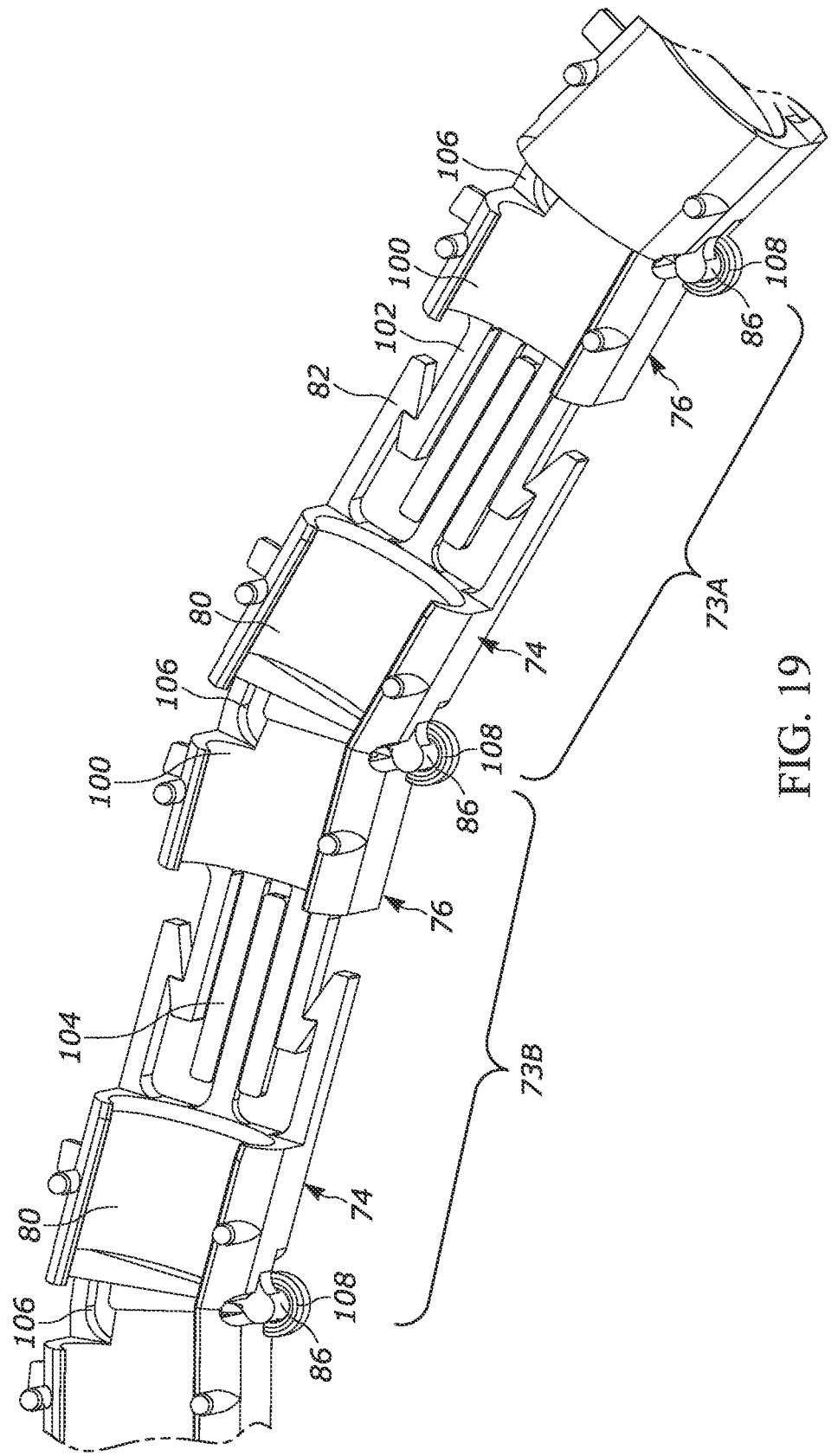
FIG. 19 is a rotated view of the carrier wreath shown in FIG. 18.
Figure 20:
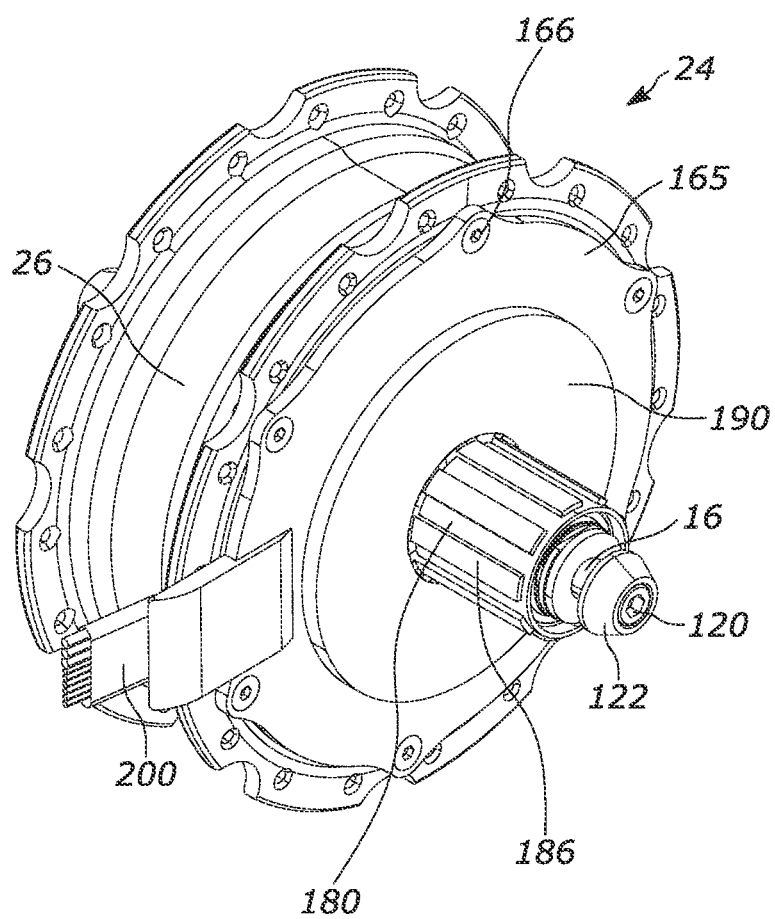
FIG. 20 is a perspective view of the wheel hub of FIG. 1, shown removed from the bicycle.
Figure 21:
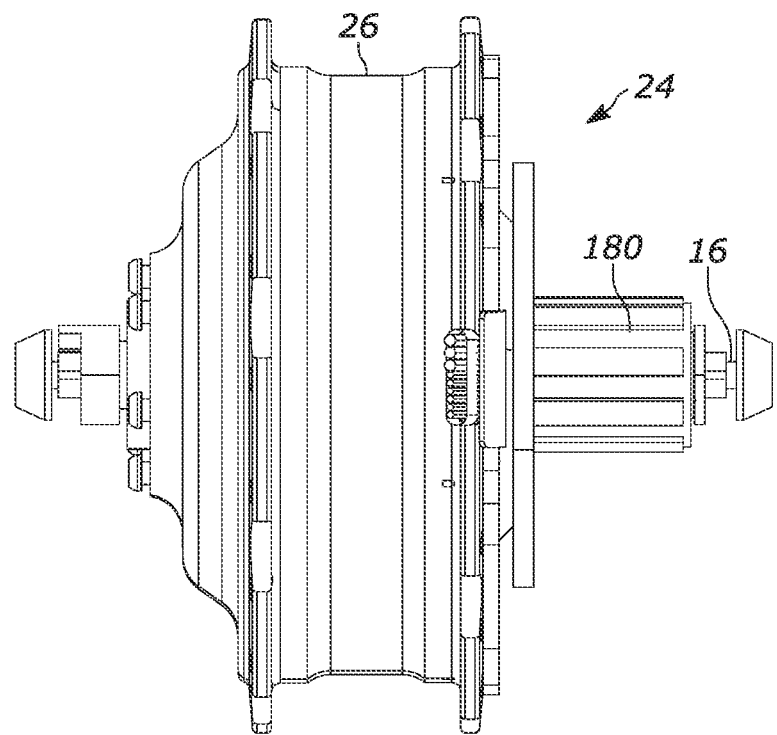
FIG. 21 is a rear view of the wheel hub of FIG. 20.
Figure 22:
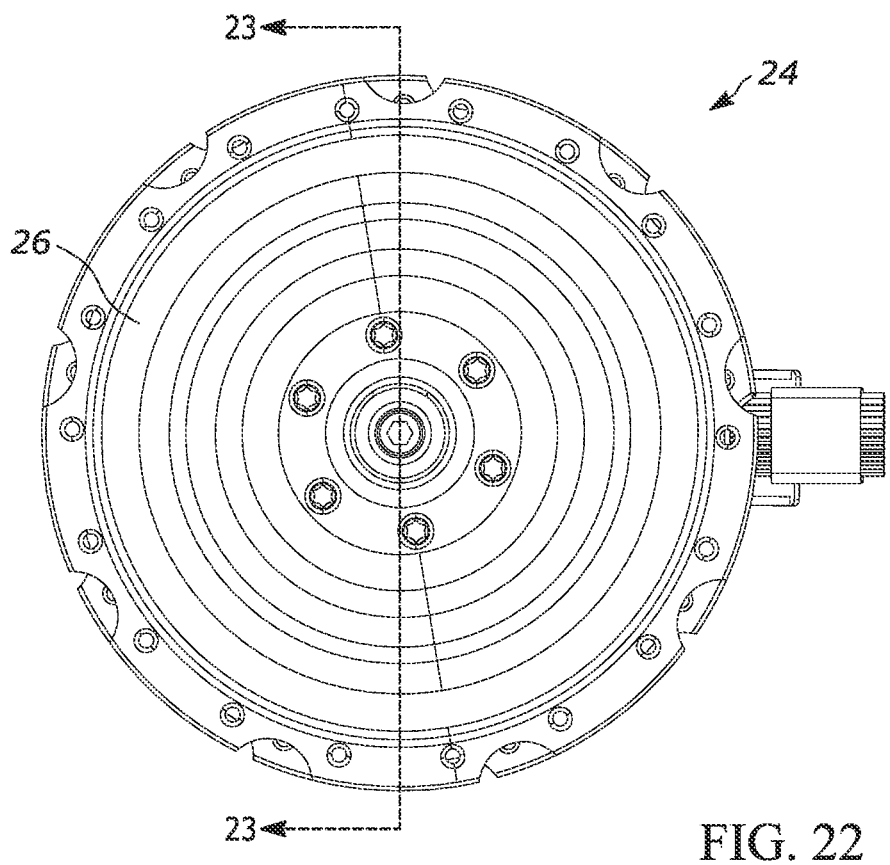
FIG. 22 is a side view of the wheel hub of FIG. 20.

Referring to FIGS. 18 and 19, illustrating partial views of the carrier wreath 44 taken from FIG. 11, a plurality of carrier links 73 are shown, wherein the coupling between the carrier links 73 occurs via insertion of the pivot peg 86 of a first carrier link (labeled 73A for discussion purposes only) into the pivot ring 108 of a second carrier link (labeled 73B for discussion purposes only), which pivotably links the carrier links 73A and 73B (forming a pivoting connection), once pivotably coupled, rotating the carrier links 73A and 73B about this pivot joint causes the carrier latch 106 to engage with the carrier catch 90, thereby latching the carrier links 73A and 73B together (forming a latching connection). In at least some embodiments, the carrier latch 106 is sized and shaped to engage the carrier catch 90 when the end walls of the carrier links 73 (primary end wall 89 and secondary end wall 105) abut. As the end walls 89, 105 are tapered in the same direction (towards a center of the carrier wreath 44), abutment of the end walls 89, 105 offsets the central longitudinal axes (112A and 112B for discussion purposes only) of the carrier links. The offset provides the curvature of the carrier wreath 44, which can easily be modified by changing the tapering of the end walls 89, 105 and length of the carrier latch 106, noting that the carrier latch 106 has a chosen curvature and length sufficient to engage the carrier catch 90. This manner of coupling the carrier links 73 can be repeated to accommodate all the battery cells 42 in the battery pack 40. Once the carrier wreath 44 is assembled it can be placed into the battery compartment 48 with the battery cells 42 and all or some of the wiring being installed before or after insertion into the battery compartment 48.

Referring now to FIGS. 20-25, various views of the wheel hub 24 of FIG. 1 are provided. The wheel hub 24 is rotationally supported by the axle 16, where in at least some embodiments, the axle 16 is securable to the frame 12 via a pair of axle bolts 120 and end caps 122, one or more keyed washers 124 can also be utilized (shown in FIGS. 20-25 along with the wheel hub 24 for illustrative purposes, while in other embodiments, the axle 16 is a thru-axle design utilizing typical thru-axle hardware for securement to the frame 12. For clarity, securement to the frame 12 is intended to include indirect securement, such as via securement to a rear frame portion on a soft-tail, a swing-arm, etc.

Figure 23:
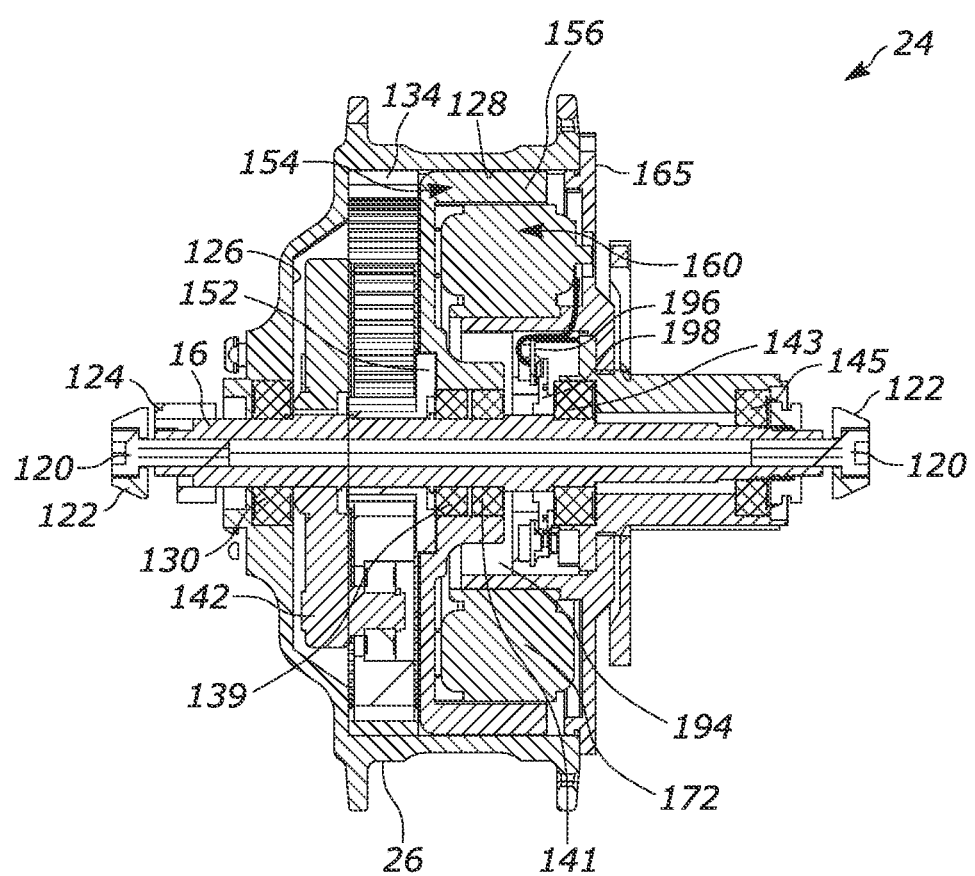
FIG. 23 is a cross-sectional rear view of the wheel hub taken along lines 23-23 of FIG. 22.
Figure 24:
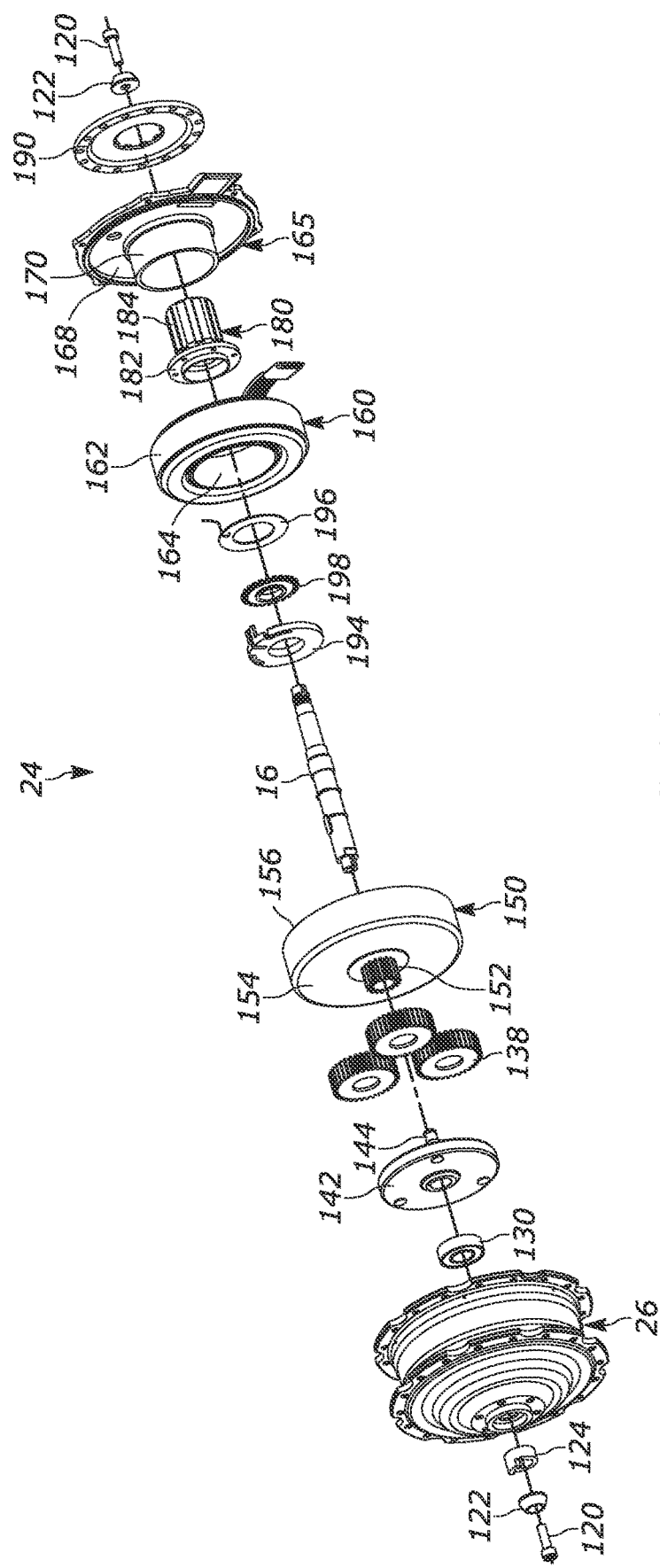
FIG. 24 is a first perspective exploded view of the wheel hub of FIG. 20.
Figure 25:
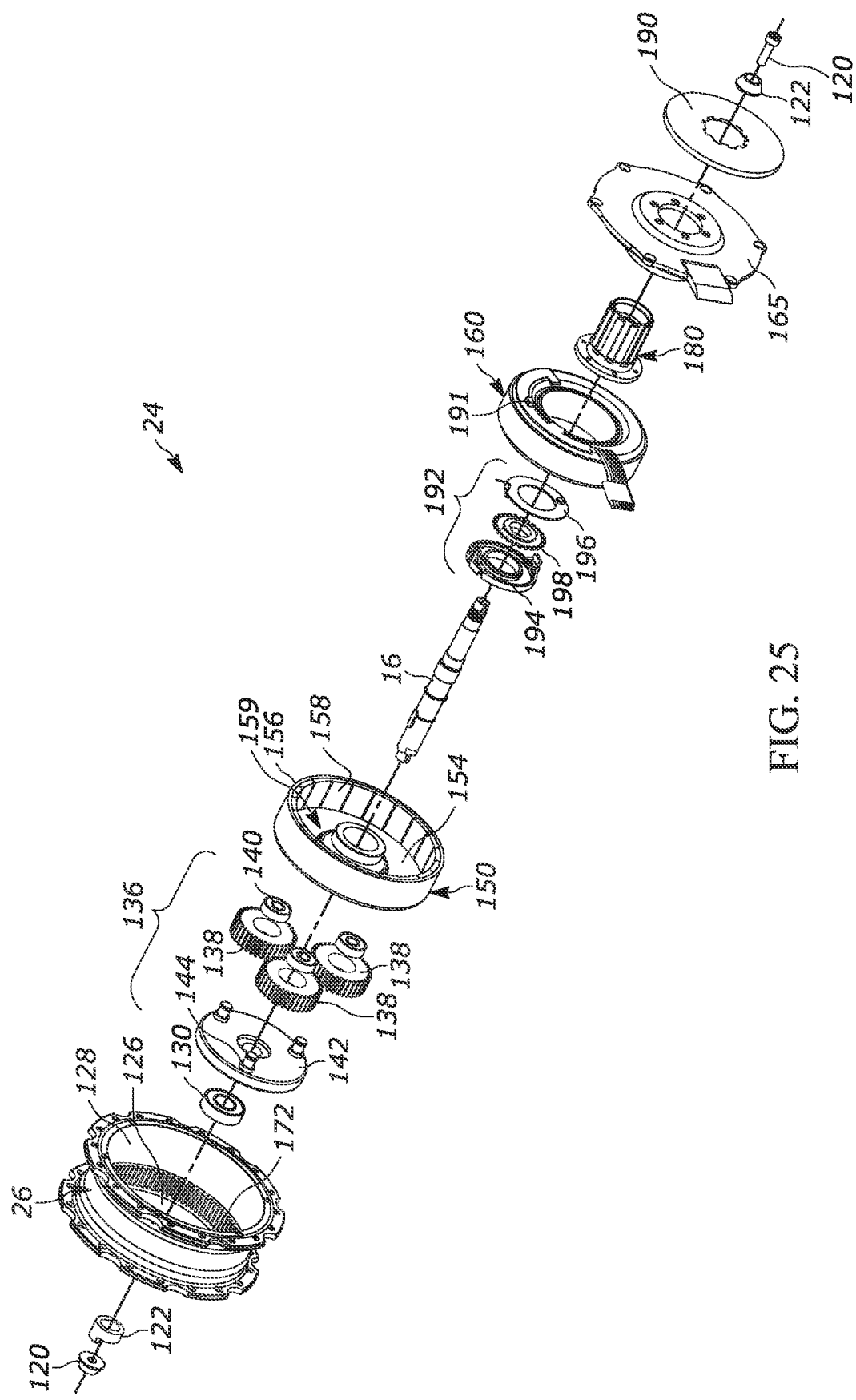
FIG. 25 is a second perspective exploded view of the wheel hub of FIG. 20.

As best seen in FIG. 23, the hub shell 26 includes a shell side wall 126 and a shell top wall 128, which can be integrally formed, or fastened together. The shell side wall 126 is coupled to the axle 16 via a housing bearing 130 to allow rotation relative thereto. The shell top wall 128 is generally ring-shaped and includes a ring gear 132 (i.e., includes inner ring gear teeth 134 positioned circumferentially and extending inward towards the axle 16). As best seen in FIGS. 24 and 25, a planetary gear set 136 is housed inside the hub shell 26 and includes a plurality of planetary gears 138 (e.g., three gears with bearings 140) coupled to a one-way clutch 142 (that includes bearing posts 144 for the planetary gears), wherein the planetary gears 138 are rotationally engaged with the ring gear 132 and the clutch is fixed to the axle 16 (e.g., keyed to prevent rotation therebetween). Various other bearings can be provided to allow rotation of other components around the axle 16, such as bearings 139, 141, 143, 145 (see FIG. 23).

A rotor 150 is provided that is secured to or formed integrally with a sun gear 152, wherein the sun gear 152 rotationally engages the planetary gears 138, such that rotation of the rotor 150 at least indirectly causes rotation of the hub shell 26. The rotor 150 includes a rotor side wall 154 and a rotor top wall 156. A plurality of magnets 158 are secured circumferentially inside the rotor 150 along the rotor top wall 156 that, along with the rotor side wall 154, form a stator cavity 159 for receiving a stator 160, the stator 160 being ring-shaped having an outer surface 162 and an inner surface 164. The rotor 150 and stator 160 form at least in part the hub motor 45.

The stator 160 is engaged with a shell cover 165 to prevent the stator 160 from rotating relative to the shell cover 165. The shell cover 165 is sized and shaped to be secured to the hub shell 26 using a plurality of fasteners 166

(e.g., screws, bolts, etc.). In at least some embodiments, the shell cover 165 includes a cover wall 168 radially extending from a cylindrical stator carrier 170, wherein the stator carrier 170 is sized to receive thereover the inner surface 164 of the stator 160 and to provide a press-fit engagement (an adhesive can be used to further the engagement). This engagement provides a direct heat transfer path from the stator 160 to the shell cover 165 to ensure good heat conduction from the stator 160 to significantly enhance stator cooling, thereby allowing higher sustained power output from the hub motor 45. Additionally, the stator may be potted in thermal epoxy, which in this design will also fill the gap between the stator 160 and the shell cover 165, which will further improve the heat transfer from the stator (i.e., stator windings) to the shell cover 165.

The stator 160 includes a plurality of stator windings 172 (FIG. 23), situated between the outer surface 162 and inner surface 164, which are energized by power from the motor controller 62. The rotor 150 and stator 160 themselves form a version of an outrunner motor configuration, wherein energizing the stator windings 172 creates a rotational force on the magnets 158 that surround the stator 160, although in a typical outrunner configuration used on a bicycle, a stator would be fixed relative to a bicycle frame to prevent rotation, thereby causing a rotational force on a rotor to rotate the rotor relative to the frame to rotate a hub. In contrast, in the disclosed invention, the stator 160 is fixed to the hub shell 26, which is rotationally supported about the axle 16. When the stator 160 is energized, a first rotational force is applied to the rotor 150 to push it in a first direction, but since the rotor 150 and stator 160 are both rotatable about the axle 16, an opposing second rotational force is applied to the stator 160. Rotation of the rotor 150 turns the sun gear 152, which turns the planetary gears 138 engaged with the ring gear 132, thereby causing both the rotor 150 and stator 160 to provide rotational forces to the hub shell 26.

Allowing the rotor 150 and stator 160 to both apply rotational forces to the hub shell 26 has numerous advantageous, for example, any electrical motor torque ripple generated by the motor controller 62 or vibration from the planetary gear meshing inconsistency is transferred between the magnets 158 via the electromagnetic force from the stator 160 to the stator/hub shell/wheel combination. This torsional vibration is dissipated in an improved way as the hub shell/wheel, which has a high torsional moment of inertia due to the mass of the battery pack 40 in the rim, can absorb that torsional vibration, and as the wheel 14 is connected to a road surface via the rubber tire 15, it can dampen any remaining vibration. The result of this is a very smooth quiet ride as the torque ripple and gear mesh vibration is not directly transferred as a torsional vibration via the axle 16 to frame 12 and the rider/user. Additionally, the relative speed of the rotor and stator are higher by a multiple of one divided by the planetary gear ratio for a set planetary gear ratio (vs a fixed stator)—which allows the hub motor 45 to run more efficiently at low hub RPM/bike speed (as motor efficiency increases versus RPM at low RPM's). This increased rotor-stator relative RPM also results in more overall motor power produced at a set hub RPM/bike speed by a multiple of one divided by the planetary gear ratio—e.g., if the gear ratio is 1:5 the rotor-stator relative RPM is 6/5 (sixth-fifths) the hub shell rpm. Therefore, the overall power output is hence 6/5 (sixth-fifths) the power output vs a fixed stator (given a constant torque generated between the rotor/stator for both variants).

The wheel hub 24 further includes a freehub body 180. Various types of freehub body configurations are known for use with coupling a hub to a rider input and can be adapted for use herein. In at least some embodiments, the freehub body 180 includes a flange 182 extending from a shaft 184 having radially extending ribs 186 sized and spaced to complementarily receive and engage the gear cassette 34. The flange 182 is secured to the shell cover 165, such as using a plurality of fasteners (not shown for clarity), while in other embodiments, the freehub 180 can include other features.

Various sensors can be utilized to provide information to the motor controller to selectively supply the desired amount of power to the hub motor 45, so that in at least some embodiments, the wheel 14 can operate autonomously, with no electrical control signals being provided outside of the wheel 14 if desired. For example, in at least some embodiments, a freewheel sensor disc 190 can be engaged with the shaft 184 (e.g., slots that receive the ribs 186) to rotate an embedded magnet simultaneously with the gear cassette 34, the rotation of the magnet can be sensed by a freewheel sensor 191 (FIG. 25) positioned on the stator 160 to monitor the user pedaling motion (speed and direction) provided via a chain and sprocket coupling with the gear cassette 34. In at least some embodiments, the freewheel sensor disc 190 and freewheel sensor 191 can be configured for optical sensing instead of magnetic sensing.

Figure 26:
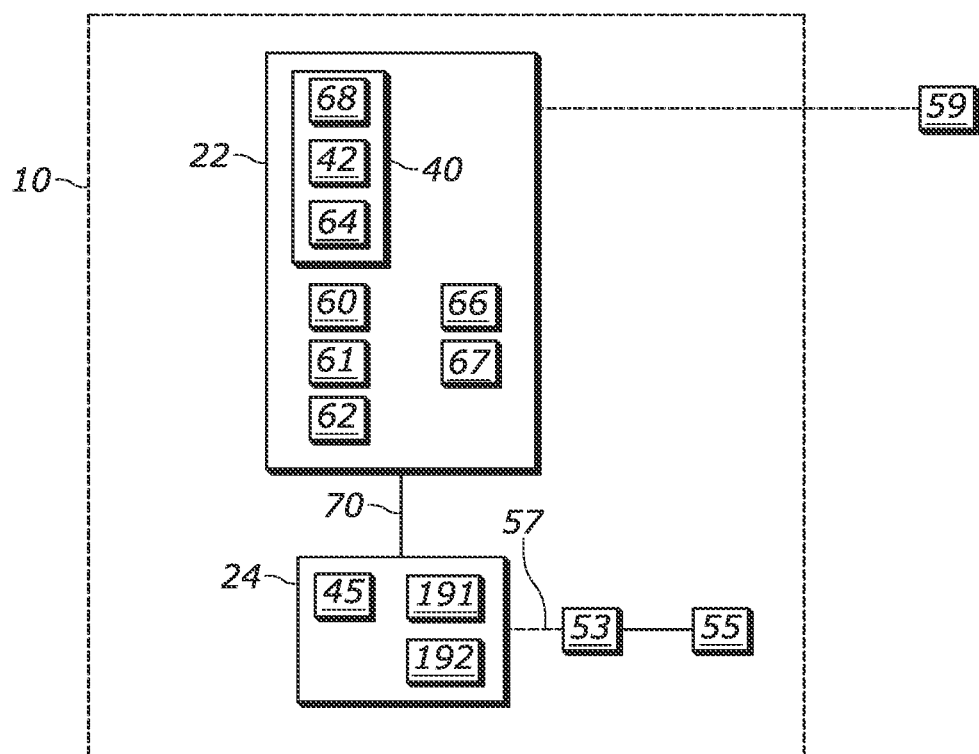
FIG. 26 is a block diagram illustrating an exemplary system configuration for the bike of FIG. 1.

Other exemplary sensors can include a shell rotation sensor assembly 192 that can be mounted within the stator carrier 170, to measure the rotation and direction of the hub shell 26 relative to the axle 16. The shell rotation sensor assembly 192 can include a shell rotation sensor housing 194 for positioning a shell rotation sensor 196 adjacent to an axle disc 198 and securing the shell rotation sensor 196 to the stator carrier 170, wherein the axle disc 198 is fixed to the axle 16, and the shell rotation sensor 196 rotates with the stator carrier 170 to sense rotation of the stator 160 relative to the axle 16 (e.g., via magnetic or optical sensing). The use of magnetic-based sensors as discussed herein can easily be replaced with other known sensor technologies (e.g., optical sensors, etc.) to perform similar functions. In at least some embodiments, the stator 160 includes a stator interface 199 (see FIG. 25), which can be mounted on the side of the stator 160 for example, and which is electrically coupled along with one or more various sensors to the motor controller 62. The stator interface 199 can include one or more circuit components, such as processor, that are mounted on a circuit board with one or more input/output connectors for receiving and/or providing power and/or sensor data. In at least some embodiments, the shell rotation sensor 196 is electrically coupled to the stator interface 199. A stator electrical connector 200 is provided external of the hub shell 26 for connection with the motor controller 62 and/or local user interface 60 in the wheel rim 22. FIG. 26 provides a system block diagram illustrating an exemplary configuration for the bicycle 10.

In addition, in at least some embodiments, various components can be consolidated into a single microchip and/or onto a single printed circuit board (e.g., the motor controller, BMS, etc.). Such consolidation can increase reliability, while decreasing overall part count, cost, wiring, and connectors, noting that typical sealed connectors commonly found on electric bikes are subject to flexing and breaking over time, so such reduction can be beneficial.

In at least some embodiments, after connecting the various components (e.g., battery cells 42, motor controller 62, BMS 64, etc.) together that will go into the battery compartment, they can be potted (encapsulated, in resin) with thermal epoxy to form a rigid ring, which is then mounted in the battery compartment 48 using various known types of fastening, such as bonding, high strength double sided tape, bolts, clips, etc. Alternatively, the potting can occur after the components have been installed inside the battery compartment 48, wherein such post-installation potting can nullify the need for the cover plate 50 to be readily removable. Potting can provide waterproofing and limit vibration damage to the wired connections.

The wheel 14 has been shown as a wheel for a bicycle 10 for exemplary purposes, although in various other embodiments, the aforementioned components, such as the battery pack 40 encircling a rim and the hub motor 45 with rotating stator and rotor can be utilized alone or jointly with wheel designs from other types of vehicles, and as such, it shall be understood that the invention can be utilized for use with, for example, wheelchairs, bicycle trailers, trailers, carts, hand carts, stand up scooters, sit down scooters/mopeds, monowheels, unicycles, tractors, strollers/joggers, tricycles, quadricycles, Light Electric vehicles, trains, trams, robots, All-Terrain Vehicles and Utility Vehicles (ATVs and UTVs), cable-cars, motorcycles, cars, etc. In addition, various non-vehicle applications, such as winch pulleys, etc. can also incorporate one or more of the aforementioned aspects of the invention.

It will be understood by those skilled in the art that one or more aspects of this invention can meet certain objectives, while one or more other aspects can lead to certain other objectives. Other objects, features, benefits and advantages of the invention will be apparent in the descriptions of the disclosed embodiments, and will be readily apparent to those skilled in the art. Such objects, features, benefits and advantages will be apparent from the above as taken in conjunction with the accompanying figures and all reasonable inferences to be drawn therefrom. Although the invention has been herein described in what is perceived to be the most practical and preferred embodiments, it is to be understood that the invention is not intended to be limited to the specific embodiments set forth above. Rather, it is recognized that modifications may be made by one of skill in the art of the invention without departing from the spirit or intent of the invention.

What is claimed is:

1. A battery wheel assembly comprising:
   a wheel comprising:
      an axle for securement to a vehicle, the axle having a central axle axis extending therethrough;
      a wheel rim; and
      a wheel hub interconnected with the wheel rim and rotatable about the central axle axis; and
   a battery pack secured to the wheel rim comprising:
      a carrier wreath having a plurality of carrier links selectably interconnected; and
      a plurality of battery cells electrically interconnected and secured to the carrier wreath.

2. The battery wheel assembly of claim 1, wherein each of the plurality of carrier links includes a primary carrier and a secondary carrier selectably coupled together.

3. The battery wheel assembly of claim 2, wherein the primary carrier includes a primary cell holder and a plurality of primary clips extending longitudinally, and the secondary carrier includes a secondary cell holder and a plurality of secondary clips extending longitudinally, and wherein the plurality of primary clips engage the plurality of secondary clips to couple the primary carrier and the secondary carrier together, and the primary cell holder and secondary cell holder secure at least one of the plurality of battery cells.

4. The battery wheel assembly of claim 3, wherein the primary carrier includes a primary alignment bar extending longitudinally with the plurality of primary clips, and the secondary carrier includes a plurality of secondary alignment bars extending longitudinally with the plurality of secondary clips and spaced to receive the primary alignment bar therebetween.

5. The battery wheel assembly of claim 4, wherein the primary carrier includes a tapered primary end wall, and the secondary carrier includes a tapered secondary end wall.

6. The battery wheel assembly of claim 5, wherein the primary carrier includes a carrier catch and the secondary carrier includes a carrier latch.

7. The battery wheel assembly of claim 6, wherein the primary carrier includes a pivot peg and the secondary carrier includes a pivot ring.

8. The battery wheel assembly of claim 1, wherein the plurality of carrier links includes a first carrier link having a first central longitudinal axis and a second carrier link having a second central longitudinal axis, and wherein the plurality of battery cells includes a first battery cell and a second battery cell.

9. The battery wheel assembly of claim 8, wherein the first carrier link and the second carrier link are coupled together via a pivotable connection and a latching connection.

10. The battery wheel assembly of claim 9, wherein the pivotable connection includes a pivot peg and a pivot ring, and wherein the pivot peg extends from one of the first carrier link or second carrier link and is received in the pivot ring extending from the other of the first carrier link or second carrier link.

11. The battery wheel assembly of claim 10, wherein the latching connection includes a carrier latch and a carrier catch, and wherein the carrier latch extends from one of the first carrier link or second carrier link and is engageable with the carrier catch situated on the other of the first carrier link or second carrier link.

12. The battery wheel assembly of claim 11, wherein the first carrier link has a tapered first end wall and the second carrier link has a tapered second end wall, and wherein when the first carrier link and the second carrier link are coupled together, the tapered first end wall and the tapered second end wall are in abutment such that the first central longitudinal axis is offset from the second central longitudinal axis.

13. The battery wheel assembly of claim 12, wherein the first battery cell is secured to the first carrier link and the second battery cell is secured to the second carrier link.

14. The battery wheel assembly of claim 13, wherein the battery pack is electrically coupled to a motor controller secured to the wheel rim, and wherein the motor controller is electrically coupled to a hub motor situated in the wheel hub.

15. The battery wheel assembly of claim 14, wherein a battery management system is electrically coupled to the plurality of battery cells.

16. The battery wheel assembly of claim 15, wherein the wheel rim further includes a battery compartment.

17. The battery wheel assembly of claim 16, wherein the battery pack, battery management system, and motor controller are situated in the battery compartment.

18. The battery wheel assembly of claim 17, wherein the wheel rim further includes a removable cover plate.

19. The battery wheel assembly of claim 18, wherein the wheel rim further includes a screen situated in the battery compartment and visible via a window in the removable cover plate.

20. A battery wheel assembly comprising:
 a wheel comprising:
  an axle for securement to a vehicle, the axle having a central axle axis extending therethrough;
  a wheel rim; and
  a wheel hub interconnected with the wheel rim and rotatable about the central axle axis;
 a hub motor situated in the wheel hub;
 a battery pack secured to the wheel rim and at least indirectly coupled electrically to the hub motor, the battery pack comprising:
  a carrier wreath; and
  a plurality of battery cells electrically interconnected and secured to the carrier wreath; and
 a battery management system secured to the wheel rim and electrically coupled to the plurality of battery cells, wherein a motor controller is electrically coupled to the hub motor and secured to the wheel rim.

21. The battery wheel assembly of claim 20, wherein the wheel rim further includes a battery compartment.

22. The battery wheel assembly of claim 21, wherein the battery pack, battery management system, and motor controller are situated in the battery compartment.

23. The battery wheel assembly of claim 22, wherein the wheel rim further includes a cover plate.

24. The battery wheel assembly of claim 23, wherein the wheel rim further includes a screen situated in the battery compartment and visible via a window in the cover plate.

* * * * *